United States Patent
Kim et al.

(10) Patent No.: US 12,221,078 B2
(45) Date of Patent: Feb. 11, 2025

(54) VEHICLE HAVING A SENSOR THAWING DEVICE USING HEATED AIR

(71) Applicants: HYUNDAI MOTOR COMPANY, Seoul (KR); KIA CORPORATION, Seoul (KR)

(72) Inventors: Tae-Hyung Kim, Incheon (KR); Jung-Joong Lee, Suwon-si (KR); Jin-Woo Kim, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 868 days.

(21) Appl. No.: 17/345,961

(22) Filed: Jun. 11, 2021

(65) Prior Publication Data
US 2022/0242375 A1    Aug. 4, 2022

(30) Foreign Application Priority Data
Jan. 29, 2021    (KR) .................. 10-2021-0012894

(51) Int. Cl.
*B60S 1/66*        (2006.01)
*B60R 13/00*       (2006.01)
(Continued)

(52) U.S. Cl.
CPC .............. *B60S 1/66* (2013.01); *B60R 13/005* (2013.01); *B60R 13/105* (2013.01); *B60S 1/026* (2013.01); *B60S 1/54* (2013.01); *B60S 1/56* (2013.01)

(58) Field of Classification Search
CPC ..... B60R 13/005; B60R 13/105; B60S 1/026; B60S 1/023; B60S 1/54; B60S 1/544; B60S 1/66; B60S 1/56; B60S 1/603; B60S 1/563; G01S 13/931; G01S 2013/93271; G01S 7/4043; B60J 10/60–70; H05B 3/84; H05B 3/845; H05B 3/86; H05B 3/62;
(Continued)

(56) References Cited

U.S. PATENT DOCUMENTS

| | | | |
|---|---|---|---|
| 7,555,807 B1 * | 7/2009 | Mastandrea | B60S 1/544 15/313 |
| 2012/0079778 A1 * | 4/2012 | Wasson | H01Q 1/1235 52/111 |

(Continued)

FOREIGN PATENT DOCUMENTS

KR    1020020041888 A    6/2002

*Primary Examiner* — Sang Y Paik
*Assistant Examiner* — Bonita Khlok
(74) *Attorney, Agent, or Firm* — Lempia Summerfield Katz LLC

(57) ABSTRACT

A sensor thawing device, applied to a vehicle, discharges high-temperature air in a target direction, which is any one of left, right, down, and up directions, to an air discharge duct extended from a molding box coupled to a radiator grill, heats outside air introduced into a heat source line with a heat source including a heating wire to convert the outside air into high-temperature air, supplies the high-temperature air to an air distribution box, moves the air discharge duct in the target direction by forming the air pressure with a part of the high-temperature air by using an air pressure actuator, and supplies the air discharge duct with the remaining high-temperature air through a moving duct.

11 Claims, 11 Drawing Sheets

(51) Int. Cl.
*B60R 13/10* (2006.01)
*B60S 1/02* (2006.01)
*B60S 1/54* (2006.01)
*B60S 1/56* (2006.01)

(58) Field of Classification Search
CPC ... H05B 3/68; H05B 3/78; H05B 3/42; H05B 3/44; H05B 3/46; H05B 3/48; H05B 3/50; H05B 3/52; H05B 3/54; H05B 3/56; H05B 3/565
USPC .............. 219/202–203, 214, 219, 228; 392/347–385
See application file for complete search history.

(56) References Cited

U.S. PATENT DOCUMENTS

| | | | |
|---|---|---|---|
| 2015/0224853 A1* | 8/2015 | Errick | B60H 1/3407 454/145 |
| 2016/0298531 A1* | 10/2016 | Anders | F02M 61/1806 |

* cited by examiner

FIG.2
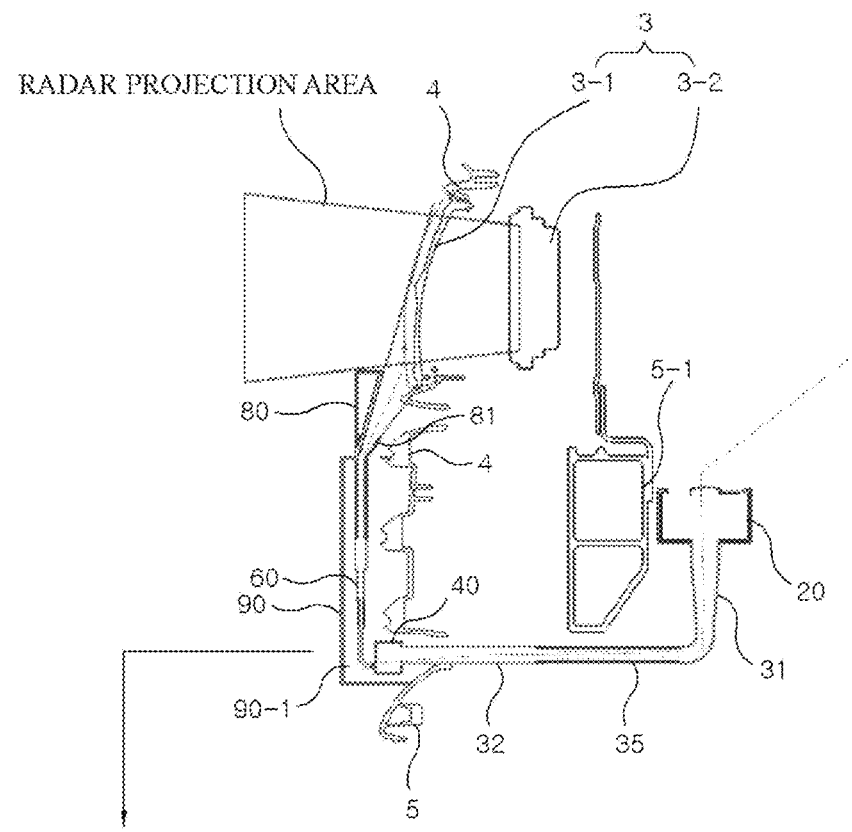
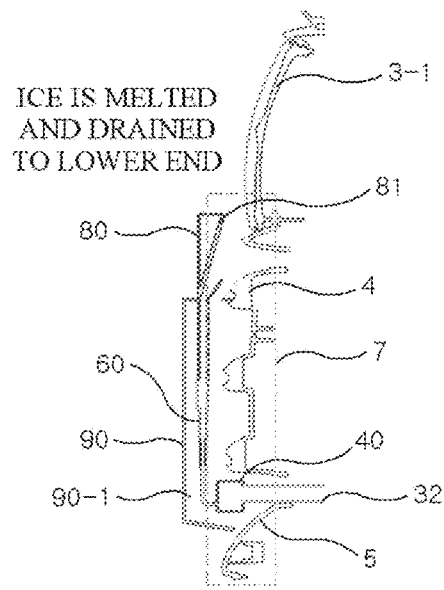

<SECTION B-B>

VEHICLE HAVING A SENSOR THAWING DEVICE USING HEATED AIR

CROSS-REFERENCE TO RELATED APPLICATION

This application claims priority to Korean Patent Application No. 10-2021-0012894, filed on Jan. 29, 2021, which is incorporated herein by reference in its entirety.

BACKGROUND OF THE DISCLOSURE

Field of the Disclosure

The present disclosure relates to a sensor thawing device, and particularly, to a vehicle having a sensor thawing device capable of thawing a sensor, without limitation to types of sensors, by using high-temperature air (hot air) discharged in a target direction, which is any one of left, right, up, and down directions. The sensor thawing device has an air discharge part that is exposed to the outside only when operating, thereby preventing a deterioration in external appearance of the vehicle.

Description of Related Art

In general, when various types of sensors installed in a vehicle have snow stuck to them or are frozen, it is difficult for the sensors to perform. In order to solve this situation, heating wires (hot wires) are provided and connected to the sensors.

An example of a sensor is a logo-integrated radar sensor. The logo-integrated radar sensor has a heating wire mounted on a logo part, and the heating wire applies heat and melts the snow or ice covering the logo part.

With the function of the heating wire, the performance of the logo-integrated radar sensor, which is implemented through the logo part, may be stably maintained even in the winter season.

However, in the case of the method of thawing the sensor with the heating wire, there is a limitation in that the radar cannot be operated when the heating wire is operated. Additionally, an external appearance of the logo part deteriorates due to the application of the heating wire.

Because the use of the method of thawing the sensor with the heating wire is limited to a structure such as the logo-integrated radar sensor to which the heating wire may be applied, the heating wire cannot be applied to a structure such as a single injection-molded product, other sensors, or a charging door, making it difficult to thaw these structures.

SUMMARY OF THE DISCLOSURE

Accordingly, an object of the present disclosure considering the above point is to provide a vehicle having a sensor thawing device, which thaws a sensor by discharging high-temperature air (hot air) toward the sensor. The sensor thawing device may be positioned in any one of left, right, down, and up directions and corresponding to a target direction, such that a single injection-molded product, other sensors, or a charging door, to which a heating wire has been difficult to apply, may be easily thawed with high-temperature air from the sensor thawing device. Further, a rapid thawing operation may be performed by the sensor thawing device on a radar and a sensor without time delay by quick heat generation according to a principle of a hair dryer using a fan and a heating wire. Also, a deterioration in external appearance of a vehicle is prevented because the sensor thawing device is exposed to the outside only when the sensor thawing device operates and performs the thawing operation.

In one aspect, a sensor thawing device according to the present disclosure includes: a heat source line configured to heat outside air with heat generated by a heat source to change the outside air into high-temperature air (hot air); an air distribution box connected to the heat source line; a duct fixing cover module configured to form an air pressure with a part of the high-temperature air discharged from the air distribution box and form a flow of air with the remaining air; an air discharge duct moved in a target direction by the air pressure and configured to discharge the flow of the air to the outside in the target direction; and a molding box having a box space configured to receive the air distribution box, the duct fixing cover module, and the air discharge duct.

In an embodiment, the outside air may be introduced into the heat source line by suction force generated by a rotation of a fan, and the heat source may be provided in the heat source line.

In an embodiment, the air distribution box may supply the part of the air to the duct fixing cover module through a left connection port and a right connection port and supply the remaining air to the duct fixing cover module through an air discharge port.

In an embodiment, the duct fixing cover module may include: a moving duct connected to the air discharge port and configured to form the flow of the air; a left air pressure actuator connected to the left connection port and configured to form the air pressure; and a right air pressure actuator connected to the right connection port and configured to form the air pressure.

In an embodiment, the moving duct may include a plurality of ducts overlapping one another and may transmit the flow of the air to the air discharge duct.

In an embodiment, the left air pressure actuator may include a connection tube connected to the left connection port and a collapsible tube having an antenna pole structure connected to the connection tube and configured to form the air pressure. The collapsible tube may be extended by the air pressure to move the air discharge duct in the target direction.

In an embodiment, the right air pressure actuator may include a connection tube connected to the right connection port and a collapsible tube having an antenna pole structure connected to the connection tube and configured to form the air pressure. The collapsible tube may be extended by the air pressure to move the air discharge duct in the target direction.

In an embodiment, the collapsible tube may have a tube stopper, and the tube stopper may restrict insertion of the collapsible tube into the connection tube.

In an embodiment, the duct fixing cover module may include a left guide rail and a right guide rail. The left guide rail may guide the movement of the air discharge duct at a left side of the moving duct and the right guide rail may guide the movement of the air discharge duct in the target direction at a right side of the moving duct.

In an embodiment, the duct fixing cover module may include a left spring and a right spring. The left spring may be stretched at a left side of the moving duct by the movement of the air discharge duct in the target direction and the right spring may be stretched at a right side of the moving duct by the movement of the air discharge duct in the target direction.

In an embodiment, the air distribution box may have a replaceable filter, and the replaceable filter may remove foreign substances from the high-temperature air.

In an embodiment, the air discharge duct may have a foreign substance screen provided in an air discharge port through which the flow of the air is discharged to the outside in the target direction. The foreign substance screen may remove foreign substances from the flow of the air.

In another embodiment, a vehicle according to the present disclosure includes: a logo sensor positioned above a radiator grill; and a sensor thawing device. The sensor thawing device is configured to discharge high-temperature air to the logo sensor through an air discharge duct extended from a molding box coupled to the radiator grill, to heat outside air introduced into a heat source line with heat generated by a heat source to convert the outside air into the high-temperature air, to supply the high-temperature air to an air distribution box, to move the air discharge duct upward by forming an air pressure with a part of the high-temperature air by using an air pressure actuator, and to supply the air discharge duct with the remaining high-temperature air through a moving duct.

In an embodiment, the outside air may be introduced into the heat source line by suction force generated by a rotation of a fan, or the outside air may be introduced into the heat source line by vehicle-induced wind introduced through a towing cap from the radiator grill.

In an embodiment, a discharge direction of the high-temperature air may be any one of a left thawing direction, a right thawing direction, a downward thawing direction, and a dual upward thawing direction in the molding box with the structure in which the moving duct, the air pressure actuator, and the air discharge duct are arranged.

In an embodiment, the high-temperature air may be supplied to a battery charging port in the left thawing direction, and the high-temperature air may be supplied to a refueling port in the right thawing direction.

In an embodiment, the heat source may be any one of a heating wire, a heat core, a positive temperature coefficient (PTC) heater, and a Peltier element which are operated by power from a battery which is supplied under control of a controller. The controller may supply the power of the battery to the heating wire in a situation in which a radar positioned inside the logo sensor cannot go to the outside through a logo.

In an embodiment, the molding box may define a drain path by an interval or space from the radiator grill, and the drain path may define a passageway through which water melted from the logo sensor by the high-temperature air is drained to a bumper positioned below the radiator grill.

In an embodiment, a license plate or a number plate may be attached to a front surface of the molding box.

The sensor thawing device applied to the vehicle according to the present disclosure implements at least the following operations and effects by utilizing heated air.

First, since high-temperature air (hot air) is used to thaw the sensor, the limitation to the type of sensor that may be thawed, the limitation present when a heating wire is directly positioned to thaw the sensor, is eliminated. Second, the sensor thawing device is easily applied to a structure for thawing single injection-molded products, other sensors, a charging door, and the like. Third, since the vehicle license plate or a number plate is used to allow the sensor thawing device to be exposed to the outside only when the sensor thawing device operates, the thawing operation is quickly performed on the logo-integrated radar sensor. Also, an external appearance of the vehicle is good, i.e., not deteriorated or negatively affected, because the sensor thawing device is hidden by the license plate or the number plate when the sensor thawing device does not operate. Fourth, the radar cover thawing function of the logo-integrated radar sensor is activated to enable the rapid thawing operation without time delay according to immediate heat generation using a principle of a hair dryer, such that the radar may quickly and normally operate. Fifth, the direction of the path of the high-temperature air (hot air) is changed by the duct. Thus, the sensor positioned in any one of the left, right, down, and up directions is determined as the target direction, such that it is possible to quickly melt ice around main sensors which are positioned on a bumper and required to activate essential functions of an autonomous vehicle when the thawing function is activated.

BRIEF DESCRIPTION OF THE DRAWINGS

FIG. 2 is a cross-sectional view taken along line A-A in FIG. 1.

DESCRIPTION OF SPECIFIC EMBODIMENTS

Hereinafter, embodiments of the present disclosure are described in detail with reference to the accompanying drawings. The embodiments are only examples and may be implemented in various different forms by those having ordinary skill in the art to which the present disclosure pertains. The present disclosure is not limited to the embodiments described herein.

Figure 1:
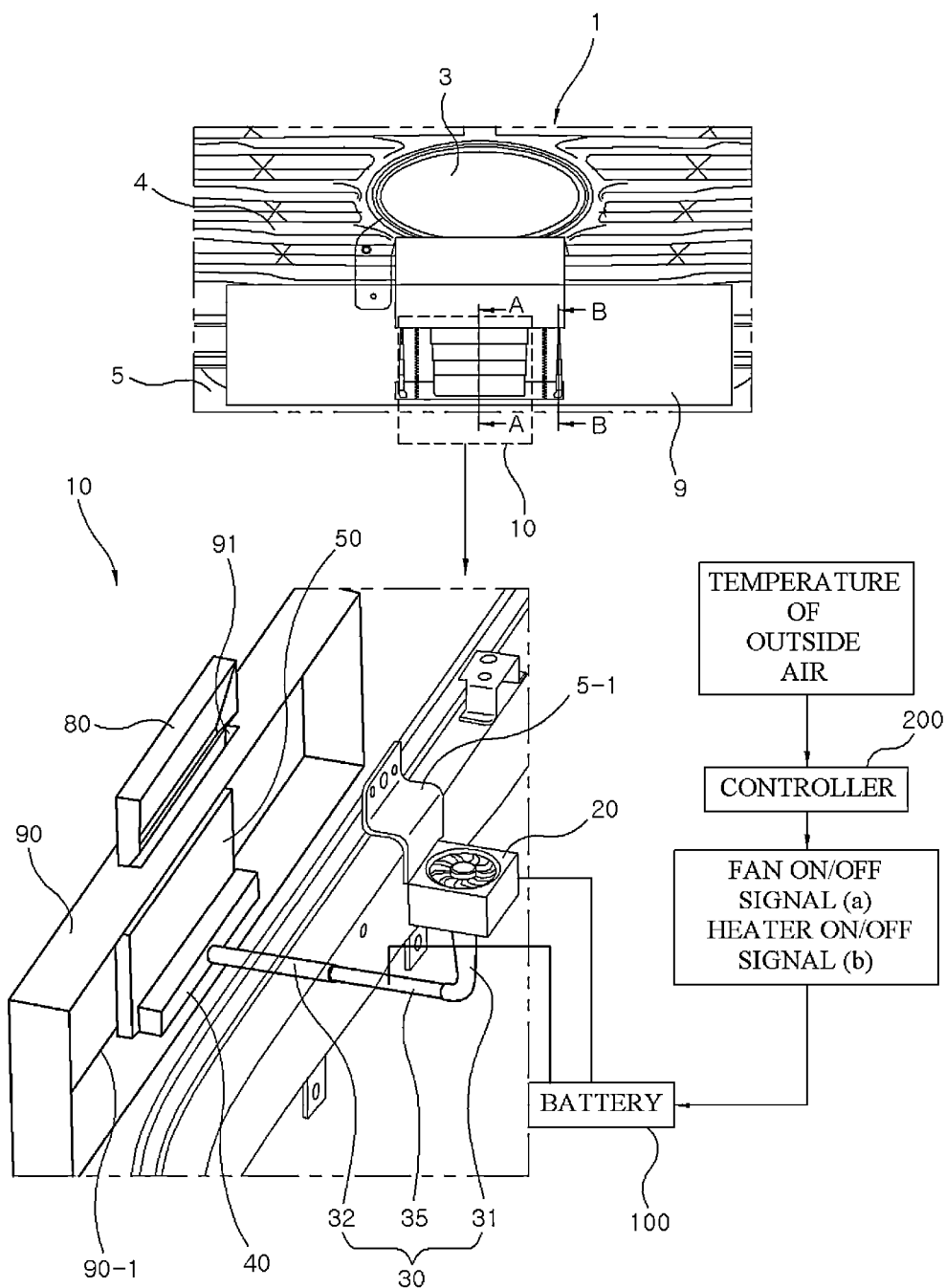
FIG. 1 is a configuration view illustrating a sensor thawing device applied to a vehicle according to the present disclosure.
Figure 3:
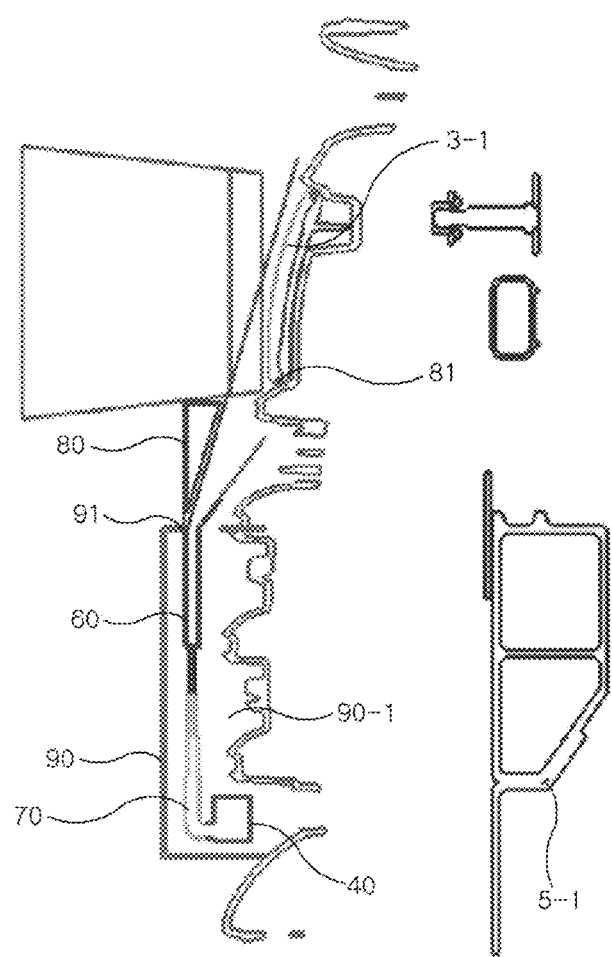
FIG. 3 is a cross-sectional view taken along line B-B in FIG. 1.

FIGS. 1-3 illustrate a configuration of an air-heating sensor thawing device 10, i.e., a sensor thawing device 10.

Referring to FIG. 1, a vehicle 1 includes the sensor thawing device 10. In particular, the sensor thawing device 10 heats low-temperature outside air (cold air) with a heat source line 30 to make high-temperature air (hot air). Snow or ice covering a logo sensor 3 or on a sensor is thereby melted. The logo sensor 3 or other sensor is positioned in any one of left, right, down, and up directions of the vehicle 1 and corresponding to a target direction of the sensor thawing device 10. As a result, the sensor thawing device 10 is characterized herein as an air-heating sensor thawing device.

The sensor thawing device 10 melts ice existing at the periphery of a main sensing functioning part of a sensor around a bumper by using air passing through a heater tube heated by electric power. The sensor thawing device 10 may be widely used to thaw not only a radar cover, but also other sensors and a charging door existing or attached at the periphery of the bumper. In particular, the sensor thawing device 10 may advantageously thaw parts around main sensors, which are positioned on the bumper and required to activate essential functions of an autonomous vehicle, without damaging the functions of the sensors while the thawing function thereof is activated.

In one embodiment, the sensor thawing device 10 is covered by a license plate (or a number plate) 9, mounted at a side of a radiator grill 4, and positioned between the logo sensor 3 and a bumper 5. The sensor thawing device 10 includes a fan 20, the heat source line 30, an air distribution box 40, a duct fixing cover module 50, an air discharge duct 80, a molding box 90, a battery 100, and a controller 200.

For example, the logo sensor 3 has a part where a radar 3-2 emits beams behind a logo 3-1 that symbolizes a vehicle manufacturer. The radiator grill 4 introduces outside air into an engine compartment. The bumper 5 is positioned below the radiator grill 4. The license plate 9 contains a vehicle number thereon.

For example, the fan 20 is supplied with power from the battery 100 and draws the outside air under control of the controller 200. The heat source line 30 heats the outside air introduced by the fan 20 to make high-temperature air (hot air).

In one embodiment, the heat source line 30 includes a fan connecting tube 31, a duct connecting tube 32, and a heat source for generating heat. The fan connecting tube 31 is connected to the fan 20 and supplied with the outside air introduced by the fan 20. The duct connecting tube 32 extends from the fan connecting tube 31 and is connected to the air distribution box 40. The heat source is provided in the duct connecting tube 32 and heats the low-temperature air (cold air) passing through the duct connecting tube 32 to make the high-temperature air (hot air). To this end, the heat source in one embodiment has a coil shape using a nichrome wire and is supplied with power from the battery 100 under control of the controller 200.

Hereinafter, the heat source is described as a heating wire 35, for example, but the heat source is not limited to the heating wire 35. For example, a heat core, a positive temperature coefficient (PTC) heater, or a Peltier element may be applied as the heat source.

For example, the air distribution box 40 transmits the high-temperature air (hot air) to the duct fixing cover module 50, moves the air discharge duct 80, and transmits the high-temperature air (hot air) discharged from the air discharge duct 80 to the logo sensor 3.

For example, the duct fixing cover module 50 moves the air discharge duct 80 upward using an air pressure of the high-temperature air (hot air) transmitted from the air distribution box 40, thereby defining a route along which the high-temperature air (hot air) is transmitted to the air discharge duct 80. The air discharge duct 80 protrudes upward from the molding box 90 to discharge the high-temperature air (hot air) to the logo sensor 3 which is the target to be finally thawed.

For example, the molding box 90 has a rectangular parallelepiped shape having a box space 90-1 and has a front surface to which the license plate 9 is attached. The duct fixing cover module 50 and the air discharge duct 80 are embedded in the box space 90-1. Therefore, the molding box 90 serves to prevent a deterioration in an aesthetic appearance of the radiator grill 4 when the sensor thawing device 10 does not operate.

For example, the battery 100 supplies power to the fan 20 and the heating wire 35. The controller 200 checks a temperature of the outside air to determine whether it is necessary to thaw the logo sensor. In order to thaw the logo sensor, the controller 200 controls the operation of the fan 20 on the basis of a fan ON/OFF signal (a) and controls the operation of the heating wire 35 on the basis of a heater ON/OFF signal (b).

Referring to FIG. 2 illustrating a cross section taken along line A-A in FIG. 1 and to FIG. 3 illustrating a cross section taken along line B-B in FIG. 1, the fan 20 is fixed in an inner space of the radiator grill 4 by an engine room bracket 5-1 by bolting, screwing, or welding. In the heat source line 30, the duct connecting tube 32 bent from the fan connecting tube 31 is connected to the molding box 90 positioned in front of the radiator grill 4. The molding box 90 is positioned in front of the radiator grill 4.

In particular, the air distribution box 40, the duct fixing cover module 50, and the air discharge duct 80 are positioned inside the box space 90-1 of the molding box 90. For example, the air distribution box 40 is connected to the duct connecting tube 32 at a lowermost position inside the box space 90-1 of the molding box 90 to transmit the high-temperature air (hot air). The duct fixing cover module 50 is connected to the air distribution box 40 inside the box space 90-1 of the molding box 90 to receive the high-temperature air (hot air). The air discharge duct 80 is connected to the duct fixing cover module 50 inside the box space 90-1 of the molding box 90 to discharge the high-temperature air (hot air) to the outside from an uppermost position.

Therefore, the sensor thawing device 10 has an interval, gap, or space between the box space 90-1 of the molding box 90 and a front portion of the radiator grill 4, thereby defining a drain path 7.

When the snow or ice existing on the logo sensor 3 is melted by the high-temperature air (hot air) discharged from an air discharge port 81 of the air discharge duct 80 protruding from the molding box 90, the water drips or flows downward from the logo sensor 3 through the drain path 7 to the front portion of the radiator grill 4. The water flows downward via the box space 90-1 of the molding box 90. The water flowing out of the box space 90-1 of the molding box 90 flows along the bumper 5 and then is discharged to the outside.

Figure 4:
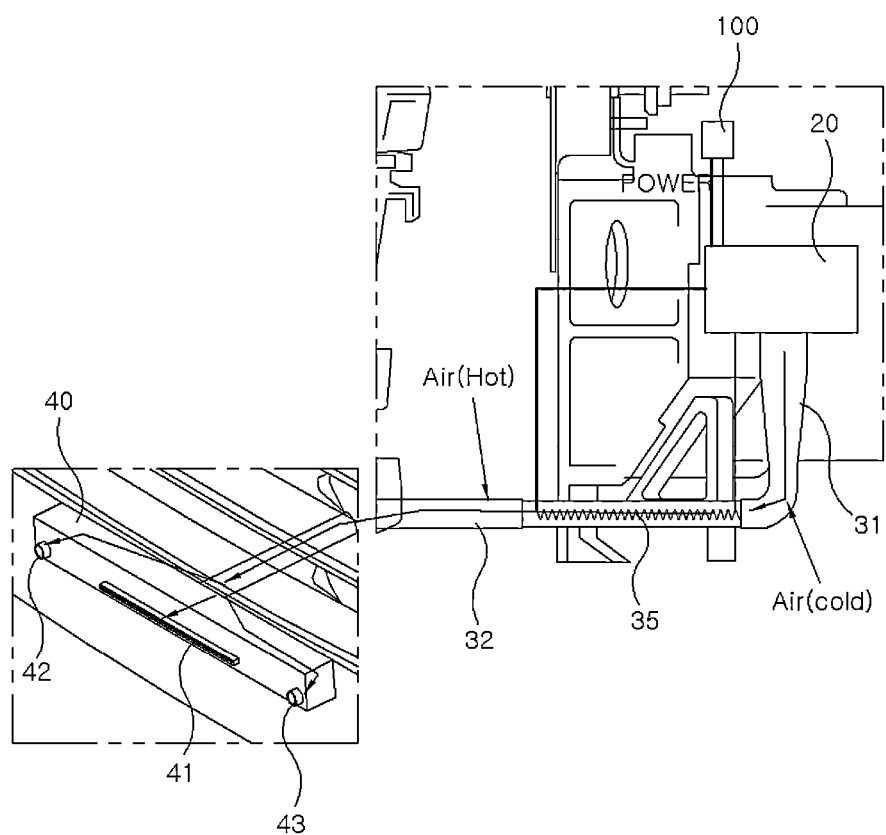
FIG. 4 is a view illustrating detailed configurations of a fan, a heat source line, and an air distribution box of the sensor thawing device according to the present disclosure.
Figure 5:
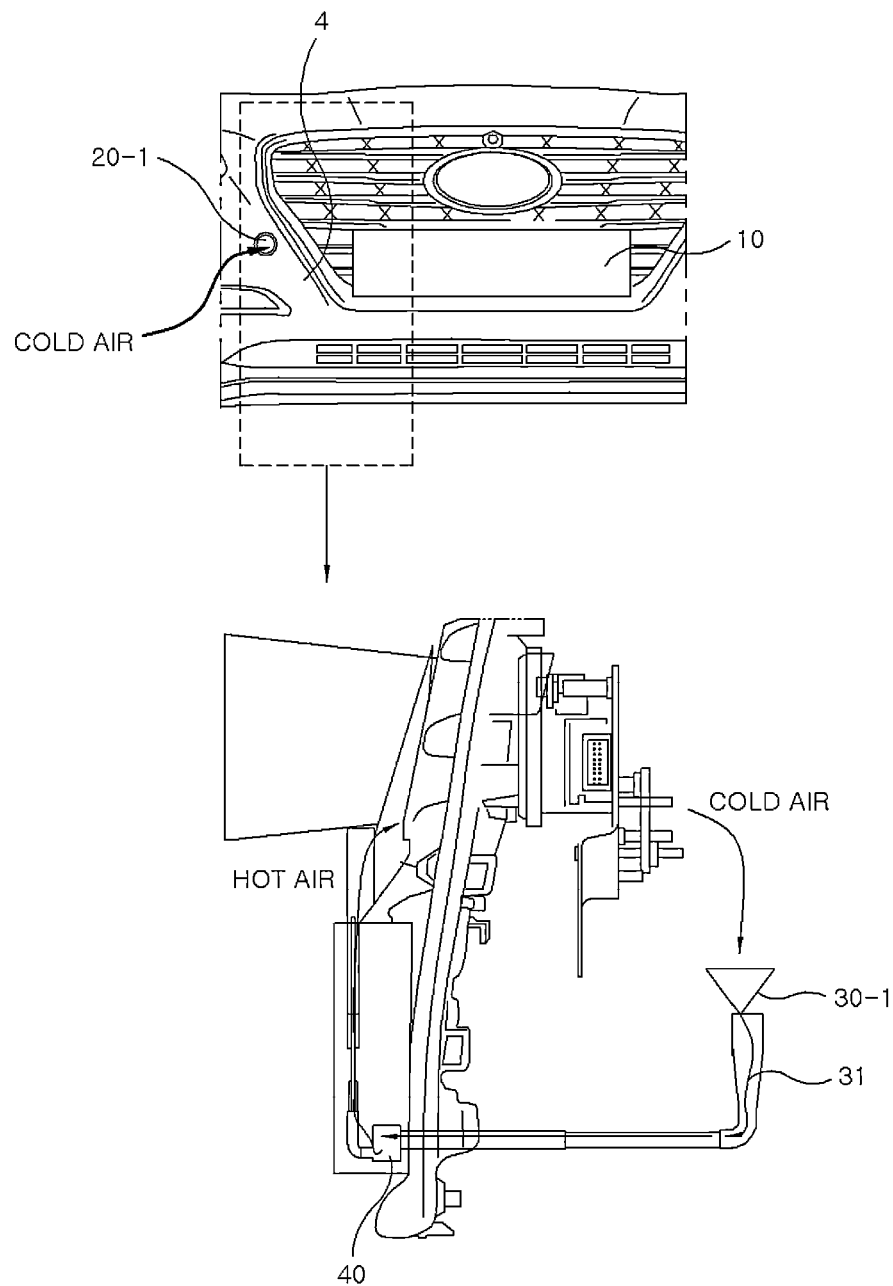
FIG. 5 is a view illustrating a modified example in which outside air is supplied to a towing cap without applying a fan according to the present disclosure.
Figure 6:
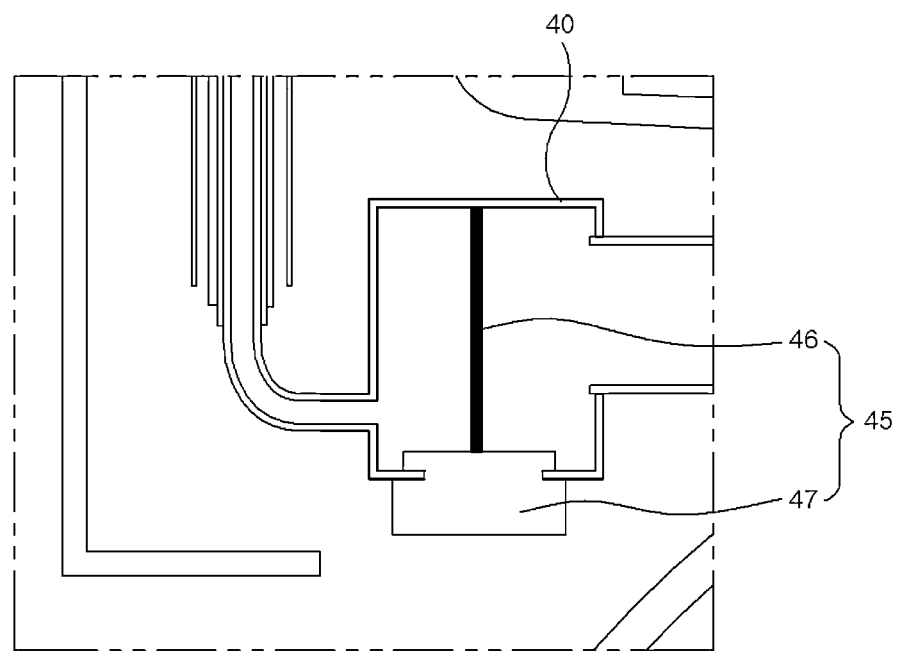
FIG. 6 is a view illustrating a modified example in which a replaceable filter is applied to the air distribution box according to the present disclosure.

Meanwhile, FIGS. 4-6 illustrate detailed configurations and partially modified structures of the fan, the heat source line, and the air distribution box which are the components of the sensor thawing device 10.

Referring to FIG. 4, the fan connecting tube 31 of the heat source line 30 is connected to a lower side of the fan 20 and the duct connecting tube 32 is connected to a lateral side of the air distribution box 40. Thus, the low-temperature outside air (cold air), which is drawn by the fan 20 operated by power supplied from the battery 100, is introduced into the fan connecting tube 31 and transmitted to the duct connecting tube 32.

Then, the heating wire 35 of the duct connecting tube 32 of the heat source line 30 generates heat with power supplied from the battery 100. Thus, the low-temperature air (cold air) is converted into the high-temperature air (hot air) and the high-temperature air is transmitted to the air distribution box 40 connected to the duct connecting tube 32.

In particular, the air distribution box 40 transmits the high-temperature air (hot air) in three directions, such that the air distribution box 40 applies the air pressure to the duct fixing cover module 50 in the two directions, among the three directions. A height of the duct fixing cover module 50 is thereby increased, and simultaneously, the high-temperature air (hot air) is transmitted to the air discharge duct 80 in one of the three directions.

To this end, the air distribution box 40 has an air discharge port 41 and a pair of left and right connection ports 42 and 43 formed in a box body having a rectangular parallelepiped shape and having an internal space.

For example, the air discharge port 41 is disposed in a central region of the air distribution box 40 and has a rectangular opening channel shape. The air discharge port 41 transmits the high-temperature air (hot air) to the duct fixing cover module 50 so that the high-temperature air (hot air) is discharged from the air discharge duct 80 via the duct fixing cover module 50.

The left and right connection ports 42 and 43 include the left connection port 42 protruding from a left portion of the air discharge port 41 and the right connection port 43 protruding from a right portion of the air discharge port 41. The left and right connection ports 42 and 43 transmit the high-temperature air (hot air) to left and right air pressure actuators 70A and 70B (see FIG. 7) of the duct fixing cover module 50 and form air pressure for moving the duct fixing cover module 50 upward by using closed structures of the left and right air pressure actuators 70A and 70B.

FIG. 5 illustrates a modified example in which the sensor thawing device 10 supplies the low-temperature outside air (cold air) to the heat source line 30 without using the fan 20.

For example, a towing cap 20-1 is provided at a side of the radiator grill 4 and a tube inlet 30-1 is provided on the fan connecting tube 31 of the heat source line 30. In this case, the towing cap 20-1 has a structure that may be opened or closed by manipulating a switch. In addition, the tube inlet 30-1 has a funnel shape that facilitates the inflow of the low-temperature outside air (cold air).

Therefore, the sensor thawing device 10 may thaw the logo sensor 3 while the vehicle travels.

In other words, when a signal from the radar 3-2 cannot be recognized due to ice on the logo sensor 3 while the vehicle travels, the towing cap 20-1 is opened and the vehicle-induced wind is introduced into the inner space of the radiator grill 4 through the towing cap 20-1. The tube inlet 30-1 of the heat source line 30 transmits the low-temperature outside air (cold air) to the fan connecting tube 31 and allows the low-temperature outside air (cold air) to flow to the duct connecting tube 32. Then, the low-temperature air (cold air) is converted into the high-temperature air (hot air) by the operation of the heating wire 35 in the duct connecting tube 32.

Thereafter, the sensor thawing device 10 is operated in the same manner as in a way described with reference to FIGS. 1-4.

FIG. 6 illustrates a modified configuration in which a replaceable filter 45 of the air distribution box 40 may remove foreign substances from the high-temperature air (hot air) in the air distribution box 40.

For example, the replaceable filter 45 is embedded in the air distribution box 40. The replaceable filter 45 includes a filter 46 provided to divide an internal space of the air distribution box 40 into front and rear spaces and includes a closure 47 detachably coupled to the box body of the air distribution box 40 and configured to support the filter 46. In this case, the detachable structure of the closure 47 may be a screw-type structure or an elastically deformable structure made of rubber.

The sensor thawing device 10 purifies, using the filter 46, the high-temperature air (hot air) introduced into the air distribution box 40 so as to thaw the logo sensor 3. Thus, only the high-temperature air (hot air) from which foreign substances are removed may be discharged from the air discharge duct 80 via the duct fixing cover module 50.

The filter 46 may be easily replaced by separating the closure 47 of the replaceable filter 45 from the box body of the air distribution box 40.

Meanwhile, FIGS. 7-9 and FIG. 11 illustrate a detailed configuration of the duct fixing cover module 50 of the air-heating sensor thawing device 10 and a partially modified structure of the air discharge duct 80.

Figure 7:
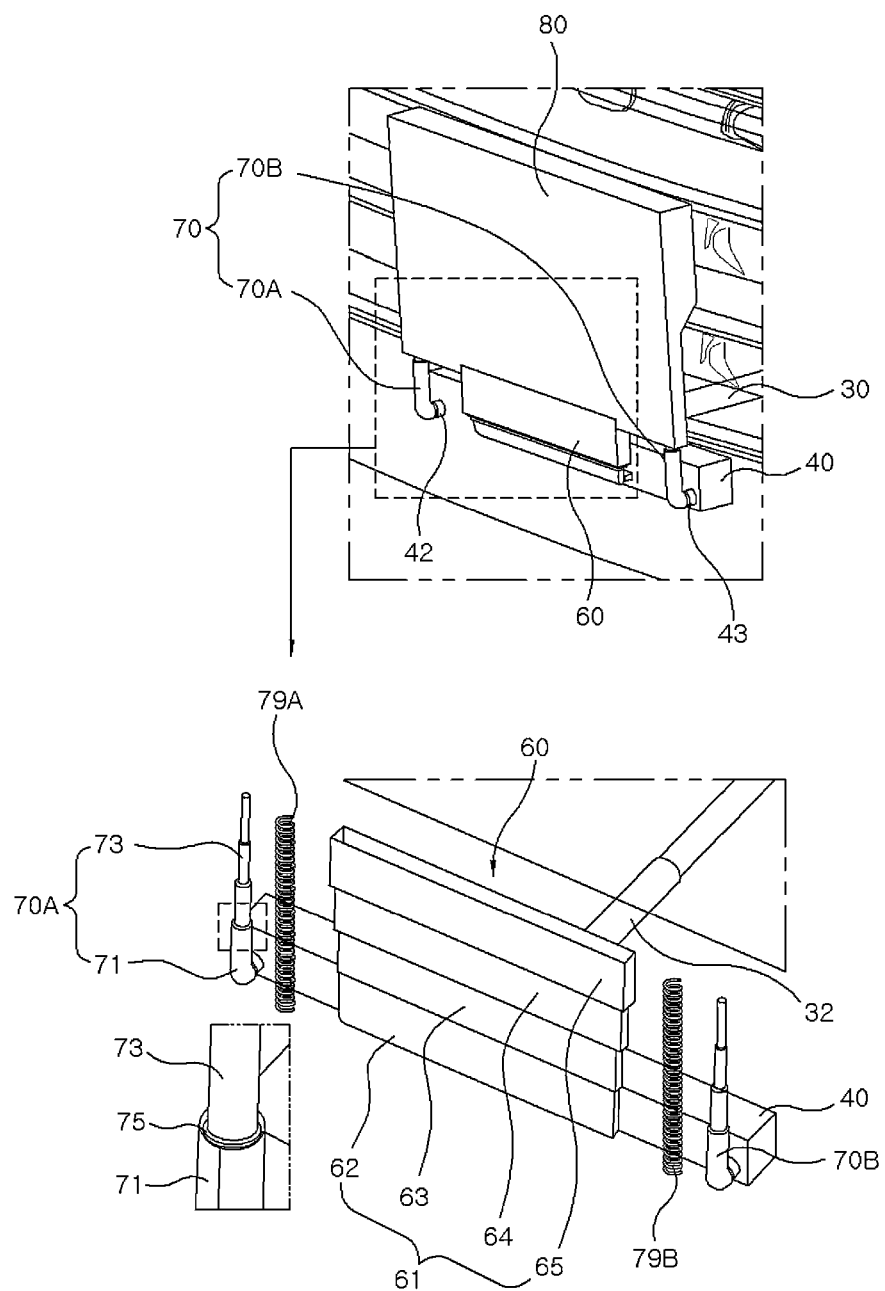
FIG. 7 is a view illustrating detailed configurations of a duct fixing cover module and an air discharge duct of the sensor thawing device according to the present disclosure.

Referring to FIG. 7, the duct fixing cover module 50 includes a moving duct 60 and the air pressure actuators 70.

Specifically, the moving duct 60 includes a collapsible duct 61 and left and right guide rails 69A and 69B.

For example, the collapsible duct 61 adjusts a position of the air discharge duct 80 protruding from the box space 90-1 of the molding box 90 and defines a flow path through which the high-temperature air (hot air) is transmitted to the air discharge duct 80. The left and right guide rails 69A and 69B include the left guide rail 69A coupled to a left side of the air discharge duct 80 and the right guide rail 69B coupled to the right side of the air discharge duct 80 inside the box space 90-1 of the molding box 90. Thus, upward and downward position movements of the air discharge duct 80 (or the movement of the air discharge duct 80 toward the target and the movement of the air discharge duct 80 away from the target) may be stably guided.

In particular, the collapsible duct 61 includes first, second, third, and fourth ducts 62, 63, 64, and 65 so as to operate in conjunction with the upward and downward position movements of the air discharge duct 80. Among the first, second, third, and fourth ducts 62, 63, 64, and 65, the first duct 62 is connected to the air discharge port 41 of the air distribution box 40, the second duct 63 is fitted with the first duct 62, the third duct 64 is fitted with the second duct 63, and the fourth duct 65 is fitted with the third duct 64. In this case, the number of ducts including the first, second, third, and fourth ducts 62, 63, 64, and 65 is four, but three or five ducts may be provided, and the number of ducts may vary depending on a size of the molding box 90.

Therefore, the second duct 63 is extended from the first duct 62 when the air discharge duct 80 moves upward. On the contrary, the second duct 63 is retracted into the first duct 62 when the air discharge duct 80 moves downward. The third duct 64 is extended from or retracted into the second duct 63, and the fourth duct 65 is extended from or retracted into the third duct 64. As a result, the first, second, third, and fourth ducts 62, 63, 64, and 65 operate in conjunction with the upward and downward position movements of the air discharge duct 80.

Specifically, when the air pressure of the high-temperature air (hot air) transmitted from the air distribution box 40 is formed, the air pressure actuator 70 is stretched to move the air discharge duct 80 upward. On the contrary, when the air pressure is eliminated, the air pressure actuator 70 is compressed to move the air discharge duct 80 downward.

To this end, the air pressure actuator 70 includes a connection tube 71, a collapsible tube 73, and a tube stopper 75.

For example, the connection tube 71 defines an inlet into which the high-temperature air (hot air) is introduced from the air distribution box 40. The collapsible tube 73 has a collapsible or telescoping antenna type structure in which a plurality of tubes having different diameters and including one tube having a closed end connected to the connection tube 71 overlaps one another. The collapsible tube 73 is stretched, like an extended telescoping antenna, when the air pressure of the high-temperature air (hot air) is applied. The tube stopper 75 is provided below the collapsible tube 73 and prevents a lowermost tube of the collapsible tube 73 from entering the connection tube 71.

In particular, the air pressure actuators 70 include the pair of left and right air pressure actuators 70A and 70B each having the connection tube 71, the collapsible tube 73, and the tube stopper 75.

Therefore, the left air pressure actuator 70A is connected to the left connection port 42 of the air distribution box 40 and the right air pressure actuator 70B is connected to the right connection port 43 of the air distribution box 40.

The air pressure actuators 70 include a pair of left and right springs 79A and 79B. In this case, each of the left and right springs 79A and 79B is configured as a coil spring.

For example, both ends of the left spring 79A are fixed to the air discharge duct 80 and the box space 90-1 of the molding box 90 at the side of the left air pressure actuator 70A. Thus, the left spring 79A is stretched when the air discharge duct 80 moves upward and the left spring 79A provides elastic restoring force when the air discharge duct 80 moves downward. Further, both ends of the right spring 79B are fixed to the air discharge duct 80 and the box space 90-1 of the molding box 90 at the side of the right air pressure actuator 70B. Thus, the right spring 79B is stretched when the air discharge duct 80 moves upward and the right spring 79B provides elastic restoring force when the air discharge duct 80 moves downward.

Figure 8:
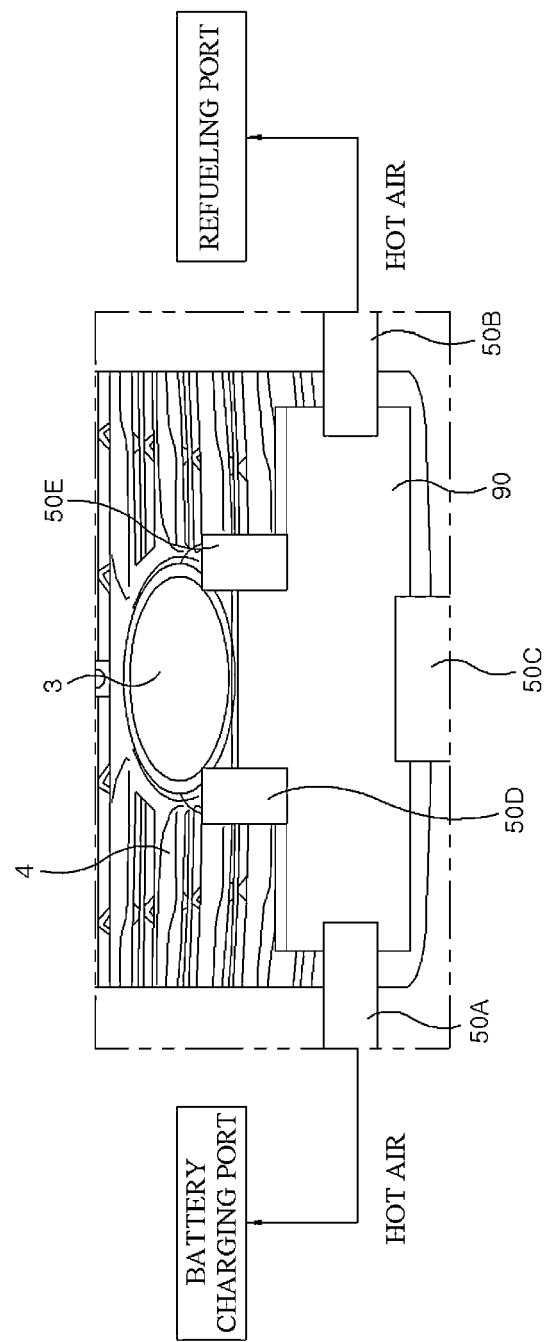
FIG. 8 is a view illustrating an example in which movement directions of the duct fixing cover module with respect to a moving duct according to the present disclosure are variously modified.

FIG. 8 illustrates a state in which the air discharge duct 80 discharges the high-temperature air in various target directions as the movement directions of the duct fixing cover module 50 with respect to the moving duct 60 are changed.

For example, when the target direction of the high-temperature air (hot air) is positioned at a left or right side of the molding box 90, the duct fixing cover module 50 disposes the moving duct 60 and the air pressure actuator 70 at the left or right side of the box space 90-1 of the molding box 90. Thus, the high-temperature air (hot air) discharged from the air discharge duct 80 may be discharged in a left thawing direction 50A or a right thawing direction 50B through the molding box 90.

When the target direction of the high-temperature air (hot air) is positioned at a lower side of the molding box 90, the duct fixing cover module 50 disposes the moving duct 60 and the air pressure actuator 70 at the lower side of the box space 90-1 of the molding box 90. Thus, the high-temperature air (hot air) discharged from the air discharge duct 80 may be discharged in a downward thawing direction 50C through the molding box 90.

When the target direction of the high-temperature air (hot air) is positioned at an upper side of the molding box 90, the duct fixing cover module 50 divides the air discharge duct 80 into two air discharge ducts 80 spaced apart from each other at an interval in a state in which the moving duct 60 and the air pressure actuator 70 are disposed at the upper side of the box space 90-1 of the molding box 90. As a result, the high-temperature air (hot air) discharged from the two air discharge ducts 80 may be discharged in a dual upward thawing direction 50D and 50E such that a part of the high-temperature air (hot air) is discharged in the left upward thawing direction 50D through the molding box 90 and the remaining high-temperature air (hot air) is discharged in the right upward thawing direction 50E.

In particular, the high-temperature air in the duct movement direction 50A may be connected to a hot air supply line in order to melt ice on a battery charging port of an electric vehicle. Also, the high-temperature air in the duct movement direction 50B may be connected to a hot air supply line in order to melt ice on a refueling port of a vehicle having an internal combustion engine.

Therefore, the duct fixing cover module 50 is connected to the air distribution box 40 and may be applied or used in various ways regardless of types of vehicles such as vehicles having internal combustion engines, electric vehicles, and hybrid vehicles.

Figure 9:
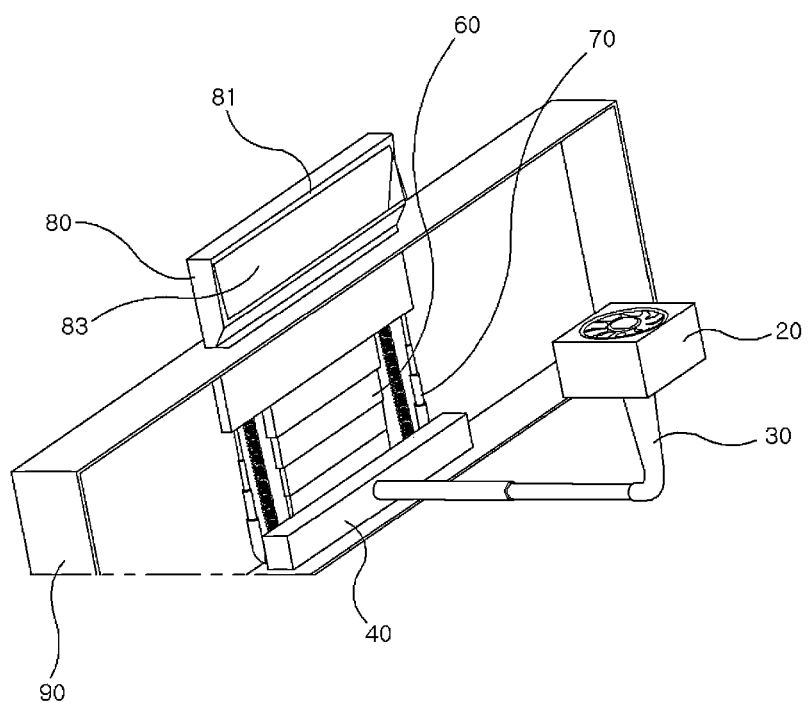
FIG. 9 is a view illustrating an example in which the air discharge duct of the duct fixing cover module according to the present disclosure is modified to a foreign substance blocking structure.

FIG. 9 illustrates a modified example in which a foreign substance screen 83 of the air discharge duct 80 may remove foreign substances from the high-temperature air (hot air) in the air distribution box 40.

For example, the air discharge duct 80 has the foreign substance screen 83 coupled to the air discharge port 81 and the foreign substance screen 83 covers a space of the air discharge port 81. Therefore, the high-temperature air (hot air) discharged to the air discharge port 81 is filtered by the foreign substance screen 83 of the air discharge duct 80. Thus, only the high-temperature air (hot air) from which foreign substances are removed may be discharged to the logo sensor 3.

Figure 10:
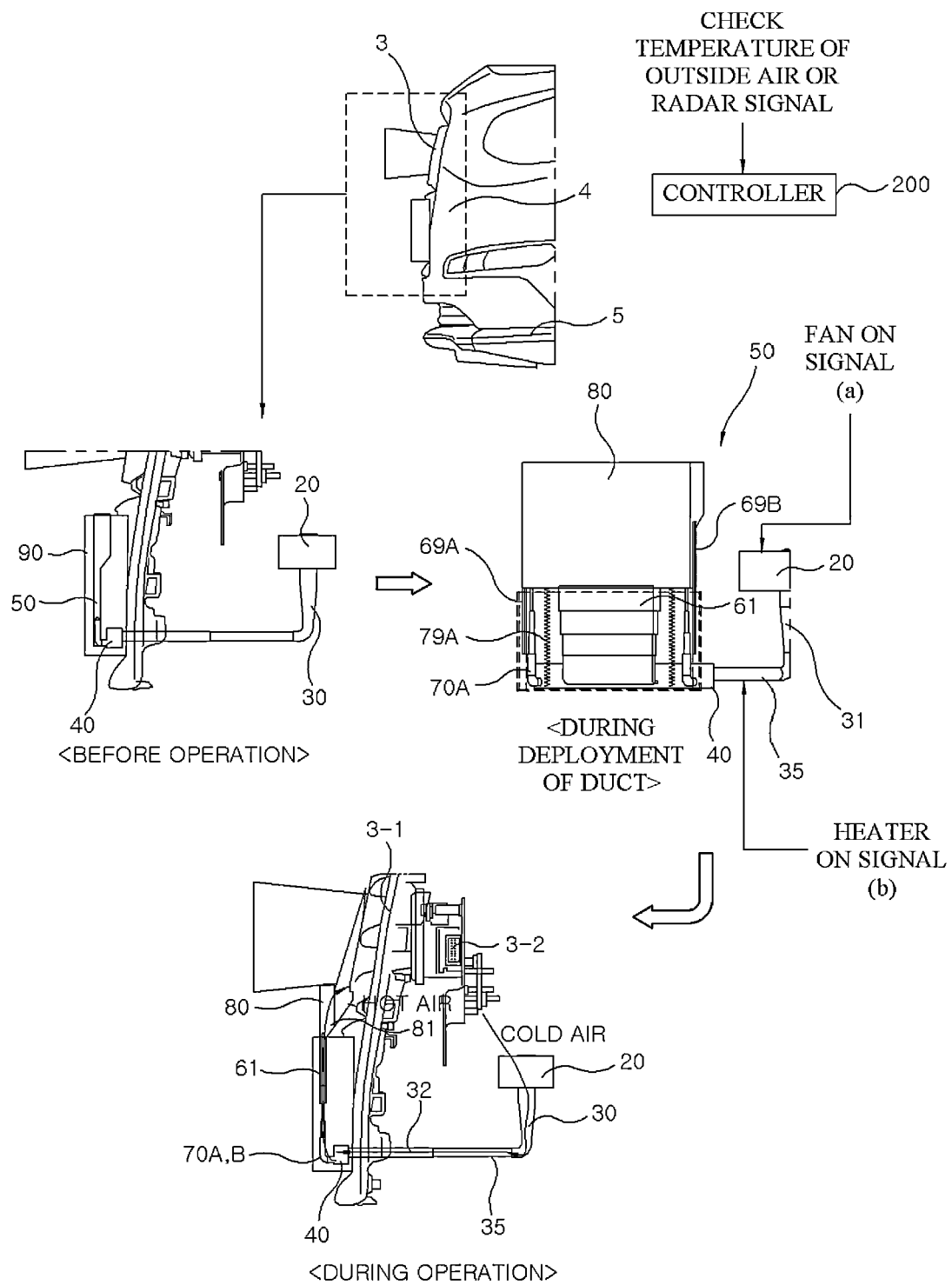
FIG. 10 is a view illustrating a state in which the sensor thawing device operates in the vehicle according to the present disclosure.
Figure 11:
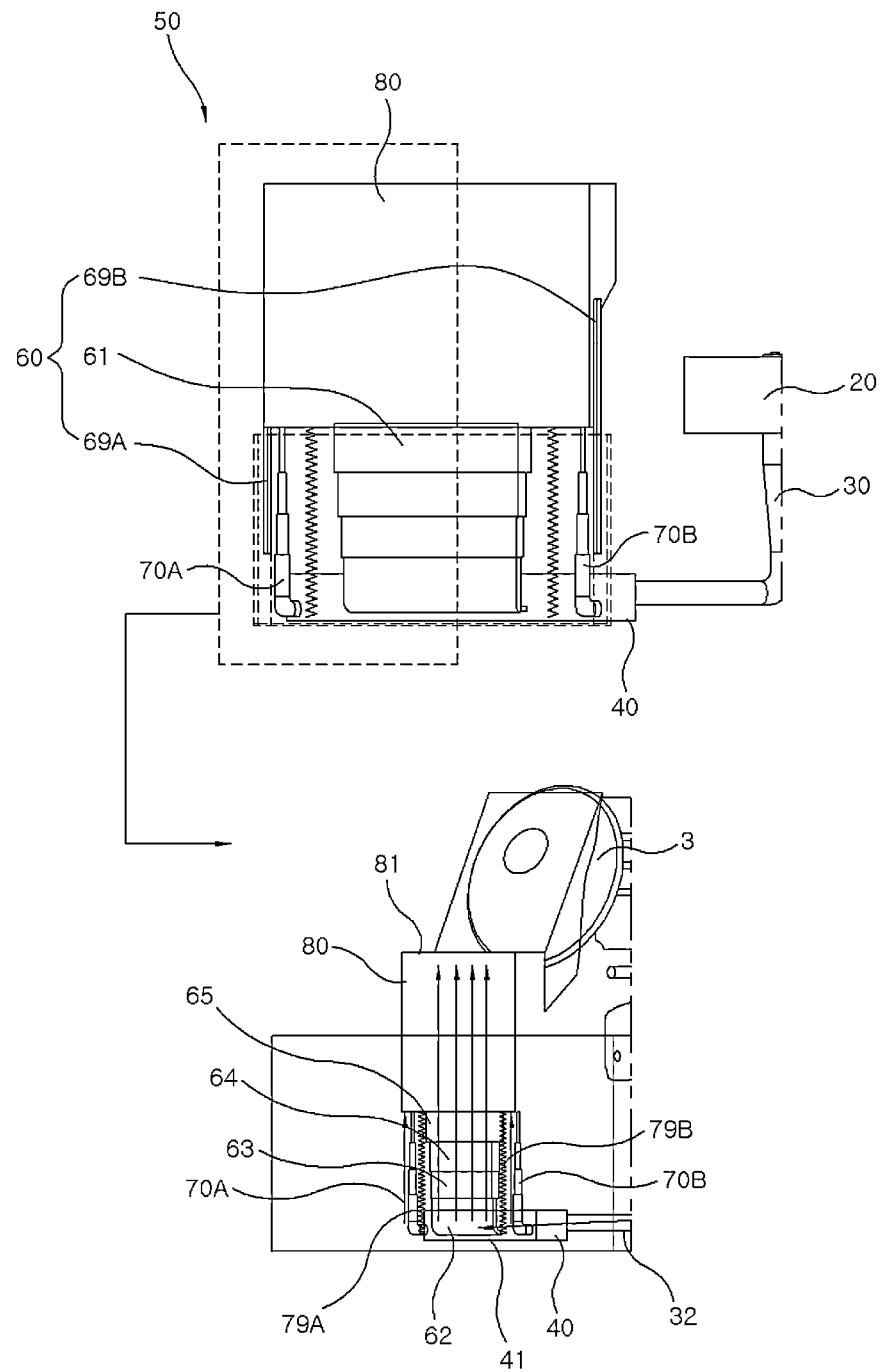
FIG. 11 is a view illustrating a state in which the sensor thawing device according to the present disclosure discharges high-temperature air (hot air) to a logo sensor, which is a thawing target, through the air discharge duct to thaw the logo sensor.

Meanwhile, FIGS. 10 and 11 illustrate a state in which the air-heating sensor thawing device 10 operates in the vehicle according to the present disclosure.

First, referring to FIG. 10 illustrating a state before the sensor thawing device 10 operates, the controller 200 checks a frozen state of the logo sensor 3 on the basis of a temperature of outside air, or the controller 200 operates the radar 3-2 to check whether a radar projection area signal is generated through the logo 3-1.

When the controller 200 determines that the temperature of the outside air is not a temperature at which the logo sensor 3 is frozen or when the radar projection area signal is generated through the logo 3-1, the controller 200 does not operate the sensor thawing device 10.

In contrast, when the controller 200 determines that the temperature of the outside air is a temperature at which the logo sensor 3 is frozen or when the radar projection area signal is not generated through the logo 3-1, the controller 200 operates the sensor thawing device 10.

However, the controller 200 may not apply the temperature of the outside air to an operational condition of the sensor thawing device 10 but may apply only whether the radar projection area signal is generated, which enables a normal state of the radar 3-2 to be recognized, to the operational condition of the sensor thawing device 10.

Next, referring to FIG. 10 illustrating a state while the duct of the sensor thawing device 10 is deployed, the controller 200 generates the fan ON signal (a) and the heater ON signal (b) and supplies power of the battery 100 to the fan 20 and the heating wire 35.

The fan 20 uses rotational force to draw the low-temperature outside air (cold air). The heat source line 30 heats the heating wire 35 to heat the low-temperature air (cold air) introduced into the duct connecting tube 32 via the fan connecting tube 31 to make the high-temperature air (hot air) and transmits the high-temperature air (hot air) to the air distribution box 40. In this case, the flow of the low-temperature air (cold air) and the flow of the high-temperature air (hot air) are formed by suction force generated by the rotation of the fan 20.

Then, the air distribution box 40 transmits the high-temperature air (hot air) to the air discharge port 41 and the left and right connection ports 42 and 43. The moving duct 60 of the duct fixing cover module 50 receives the high-temperature air (hot air) discharged from the air discharge port 41. Also, the air pressure actuators 70, i.e., the left and right air pressure actuators 70A and 70B, receive the high-temperature air (hot air) discharged from the left and right connection ports 42 and 43.

Accordingly, the collapsible tube 73 of each of the left and right air pressure actuators 70A and 70B, which is connected to the connection tube 71 and has the closed end, is filled with the high-temperature air (hot air) to form an air pressure and the collapsible tube 73 is moved upward, like an antenna, by the air pressure. Thus, the air discharge duct 80 is moved upward and the upward movement of the air discharge duct 80 pulls the moving duct 60.

In this case, each of the left and right guide rails 69A and 69B supports the upward movement of the air discharge duct 80 to ensure movement stability when the air discharge duct 80 moves upward. Each of the left and right springs 79A and 79B is stretched by the upward movement of the air discharge duct 80 and provides elastic restoring force when the air discharge duct 80 moves downward.

Finally, referring to FIG. 10 illustrating a state while the sensor thawing device 10 is operating, when the fan 20 is continuously operated by the controller 200, the high-temperature air (hot air) is discharged from the air distribution box 40 to the air discharge port 81 of the air discharge duct 80 via the collapsible duct 61 of the moving duct 60. Snow or ice is thereby removed from the logo 3-1 of the logo sensor 3. In this case, the drain path 7, which is formed by the interval or space between the radiator grill 4 and the box space 90-1 of the molding box 90, discharges the water, which is melted from the logo sensor 3 and flows downward, to the outside along the bumper 5 via the radiator grill 4.

As described above, it can be seen that the high-temperature air (hot air) is discharged upward in the target direction toward the logo 3-1 of the logo sensor 3. However, it is apparent that when the target direction is the left/right direction or the up/down direction as illustrated in FIG. 8, the high-temperature air (hot air) may be discharged in any one of the left, right, down, and up directions.

Thereafter, the controller 200 checks the generation of the radar projection area signal that enables the normal state of the radar 3-2 to be ascertained. Then the controller 200 stops the operation of the fan 20 and the operation of the heating wire 35.

Then, each of the left and right air pressure actuators 70A and 70B switches to an air pressure release state. The compressive force (i.e., elastic restoring force) of the left and right springs 79A and 79B pulls the air discharge duct 80 downward to move the air discharge duct 80 downward, such that the unfolded states of the collapsible tube 73 and the moving duct 60 return back to the folded states.

As a result, the air discharge duct 80 is retracted into the box space 90-1 of the molding box 90 and not exposed to the outside.

Meanwhile, referring to FIG. 11, when the high-temperature air (hot air) is discharged to the air discharge duct 80, each of the first, second, third, and fourth ducts 62, 63, 64, and 65 of the collapsible duct 61 are extended and stretched like an antenna, and the collapsible tubes 73 of the left and right air pressure actuators 70A and 70B are also extended and stretched like an antenna.

Therefore, each of the first, second, third, and fourth ducts 62, 63, 64, and 65 allows the amount of high-temperature air (hot air) to be smoothly transmitted to the air discharge duct 80. Also, the collapsible tube 73 maintains the upward movement position of the air discharge duct 80 with the air pressure of the high-temperature air (hot air).

As described above, the sensor thawing device 10 applied to the vehicle 1 according to the present embodiment discharges high-temperature air (hot air) in the target direction, which is any one of the left, right, down, and up directions, to the air discharge duct 80 extended from the molding box 90 coupled to the radiator grill 4. Further, the sensor thawing device 10 heats the outside air introduced into the heat source line 30 with the heat source including the heating wire 35 to convert the outside air into the high-temperature air (hot air). The sensor thawing device 10 also supplies the high-temperature air (hot air) to the air distribution box 40, moves the air discharge duct 80 in the target direction by forming the air pressure with a part of the high-temperature air by using the air pressure actuator 70, and supplies the air discharge duct 80 with the remaining high-temperature air through the moving duct 60. As described, rapid thawing operation is performed without time delay according to the principle of a hair dryer using the fan 20 and the heating wire 35. This enables the normal operation of the radar 3-2 and prevents or inhibits deterioration in the external appearance of the vehicle is because the air-heating sensor thawing device 10 is not exposed to the outside when the air-heating sensor thawing device 10 is not operated.

What is claimed is:

1. A sensor thawing device comprising:
   a heat source line configured to heat outside air with heat generated by a heat source to change the outside air into high-temperature air;
   an air distribution box connected to the heat source line;
   a duct fixing cover module configured to form an air pressure with a part of the high-temperature air discharged from the air distribution box and form a flow of air with the remaining air;
   an air discharge duct configured to be moved in a target direction by the air pressure and discharge the flow of the air to the outside in the target direction; and
   a molding box having a box space configured to receive the air distribution box, the duct fixing cover module, and the air discharge duct,
   wherein the air distribution box comprises an air discharge port, a left connection port, and a right connection port, and
   wherein the duct fixing cover module includes
   a moving duct connected to the air discharge port and configured to form the flow of the air,
   a left air pressure actuator connected to the left connection port and configured to form the air pressure, and
   a right air pressure actuator connected to the right connection port and configured to form the air pressure.

2. The sensor thawing device of claim 1, wherein the outside air is introduced into the heat source line by suction force generated by a rotation of a fan.

3. The sensor thawing device of claim 1, wherein the heat source is provided in the heat source line.

4. The sensor thawing device of claim 1, wherein the air distribution box supplies a part of the air to the duct fixing cover module through the left connection port and the right connection port and supplies the remaining air to the duct fixing cover module through the air discharge port.

5. The sensor thawing device of claim 1, wherein the moving duct comprises a plurality of ducts overlapping one another and transmits the flow of the air to the air discharge duct.

6. The sensor thawing device of claim 1, wherein each of the left air pressure actuator and the right air pressure actuator has a telescopically collapsible tube structure, wherein the collapsible tube structure of the left air pressure actuator is connected to the left connection port through a left connection tube for forming the air pressure, wherein the collapsible tube structure of the right air pressure actuator is connected to the right connection port through a right connection tube for forming the air pressure, and wherein the collapsible tubes structures are extended by the air pressure to move the air discharge duct in the target direction.

7. The sensor thawing device of claim 6, wherein each of the collapsible tube structures has a tube stopper, and the tube stopper restricts insertion of the collapsible tube structure into the respective connection tube.

8. The sensor thawing device of claim 1, wherein the duct fixing cover module comprises a left guide rail and a right guide rail, wherein the left guide rail guides the movement of the air discharge duct at a left side of the moving duct, and wherein the right guide rail guides the movement of the air discharge duct at a right side of the moving duct.

9. The sensor thawing device of claim 1, wherein the duct fixing cover module comprises a left spring and a right spring, wherein the left spring is stretched at a left side of the moving duct by the movement of the air discharge duct in the target direction, and wherein the right spring is stretched at a right side of the moving duct by the movement of the air discharge duct in the target direction.

10. The sensor thawing device of claim 1, wherein the air distribution box has a replaceable filter, and wherein the replaceable filter removes foreign substances from the high-temperature air.

11. The sensor thawing device of claim 1, wherein the air discharge duct comprises an air discharge port provided with a foreign substance screen through which the flow of the air is discharged to the outside in the target direction, and wherein the foreign substance screen removes foreign substances from the flow of the air.

* * * * *